United States Patent [19]

Biebel et al.

[11] Patent Number: 5,429,240
[45] Date of Patent: Jul. 4, 1995

[54] LIGHT-TIGHT CONTAINER

[75] Inventors: Thomas P. Biebel, Woodbury; Davis W. Chamberlin, St. Paul, both of Minn.; Jacqueline J. Forbes, Austin, Tex.; Susan K. Jongewaard, North St. Paul; Gerald J. Niles, St. Paul, both of Minn.

[73] Assignee: Minnesota Mining and Manufacturing Company, St. Paul, Minn.

[21] Appl. No.: 999,289

[22] Filed: Dec. 30, 1992

[51] Int. Cl.⁶ .................... B65D 85/48; B65D 6/00
[52] U.S. Cl. ...................... 206/455; 206/509; 206/309; 206/454; 220/212.5; 220/254; 220/255; 220/324; 220/339; 220/771
[58] Field of Search ............... 220/4.22, 4.23, 212.5, 220/254, 255, 324, 337, 339, 771; 206/309, 454, 455, 509

[56] References Cited

U.S. PATENT DOCUMENTS

| | | |
|---|---|---|
| D. 317,078 | 5/1991 | Niles . |
| 1,352,615 | 9/1920 | MacLagan . |
| 3,441,071 | 4/1969 | Schurman et al. . |
| 3,612,233 | 10/1971 | Nagpal et al. . |
| 3,710,977 | 1/1973 | Van Den Enden et al. . |
| 3,896,929 | 7/1975 | Mills ..................... 220/339 X |
| 4,060,173 | 11/1977 | Dahl . |
| 4,169,671 | 10/1979 | Culler . |
| 4,259,586 | 3/1981 | Schmidt et al. . |
| 4,313,538 | 2/1982 | Bauer et al. . |
| 4,330,248 | 5/1982 | Platte . |
| 4,336,883 | 6/1982 | Krug et al. ............... 220/339 X |
| 4,341,307 | 7/1982 | Shyers ..................... 220/339 X |
| 4,422,547 | 12/1983 | Abe et al. ................. 206/454 X |
| 4,431,139 | 2/1984 | Barnsbee et al. . |
| 4,585,138 | 4/1986 | Jonkers . |
| 4,643,281 | 2/1987 | Erickson . |
| 4,715,500 | 12/1987 | Heylen et al. . |
| 4,759,495 | 7/1988 | Moon . |
| 4,759,838 | 7/1988 | Mayes et al. ............. 220/4.23 X |
| 4,779,113 | 10/1988 | Morse et al. . |
| 4,779,756 | 10/1988 | Buelens et al. . |
| 4,889,233 | 12/1989 | Torii .......................... 206/455 |
| 4,974,740 | 12/1990 | Niles et al. . |
| 4,991,717 | 2/1991 | May et al. . |
| 5,016,753 | 5/1991 | Henderson . |
| 5,029,709 | 7/1991 | Faulstick . |
| 5,064,088 | 11/1991 | Steffes ........................ 220/339 |
| 5,125,511 | 6/1992 | Chamberlin et al. . |
| 5,156,267 | 10/1992 | Yates, Jr. et al. ........ 220/337 X |
| 5,269,430 | 12/1993 | Schlaupitz et al. ....... 220/4.23 |

FOREIGN PATENT DOCUMENTS

| | | |
|---|---|---|
| 0367694A1 | 5/1990 | European Pat. Off. . |
| 2553987 | 10/1983 | France . |
| 2553987A1 | 5/1985 | France . |
| 8804283 | 5/1988 | Germany . |
| 8421282 | 7/1989 | Germany . |
| 9209195 | 10/1992 | Germany . |

Primary Examiner—Allan N. Shoap
Assistant Examiner—Stephen Cronin
Attorney, Agent, or Firm—Gary L. Griswold; Walter N. Kirn; William K. Weimer

[57] ABSTRACT

A reclosable light-tight container for storing a plurality of sheets of light-sensitive material includes a lower wall, an upper wall, and a plurality of side walls. A door is formed as part of the upper wall, and a door hinge permits the container to be opened and closed. A reclosable light-tight closure is created by an unbroken wall formed on the inner surface of the lower wall and extending around and enclosing the portion of the inner surface corresponding to the door location when the door is closed. A raised platform on the inner surface of the upper wall door has a top surface which abuts the inner surface of the lower wall outside of the unbroken wall when the door is closed. The raised platform blocks light from entering the container by covering the parting line between the unbroken wall on the lower wall and the upper wall. A tab on the unbroken wall blocks light at the door hinge.

20 Claims, 5 Drawing Sheets

LIGHT-TIGHT CONTAINER

TECHNICAL FIELD

The present invention relates to containers. More particularly, the present invention relates to containers for holding light-sensitive sheets of material.

BACKGROUND OF THE INVENTION

Sheets, such as drawings, blueprints, and graphic arts materials, are often printed or photographed on large pieces of paper, negatives, transparencies or other media and must be stored and transported to prevent damage to the sheets and to allow a viewer to view them. Under many circumstances, sheets must be protected from dust, dirt, light, and moisture, and are most easily used if they are stored flat. Some sheets can be delicate and difficult to replace, and require protection from the force of external impacts.

One method of storing sheets involves rolling the sheets into a cylindrical shape and inserting them into a sleeve, typically made of cardstock or plastic. Blueprints are often stored this way. This can be unsatisfactory because the sheets tend to curl, making it difficult to view them after storage for even short periods of time. Curled sheets often must be laid flat and weighted, both to permit viewing and to smooth the sheets for further use. Many cylindrical containers, particularly when constructed from cardstock, are not sufficiently resilient to protect the contents from damage from impacts, and often do not include light and dust seals, which is important when storing light-sensitive materials.

Another common sheet storage container is a flat, envelope-type container constructed of cardstock. These containers are popular for transporting drawings and other materials, but they too are inadequate. Although the container is flat and stores the sheets in a desirable position, there are no light and dust seals, and paperboard is not sufficiently resilient to withstand impact without damaging the contents. These containers do not adequately protect their contents from moisture. Moreover, cardstock can generate dust which can further harm, scratch, or make dirty the stored product.

Many examples of envelope-type light-tight containers for storing a plurality of sheets of light-sensitive material are known. These containers typically include a lower wall, an upper wall, a hinge connecting the upper and lower walls, and side walls. The hinge permits the container to be opened and closed. For example, U.S. Pat. No. 3,710,977 discloses a container having a latch which is backed with a spring plate and standing walls to prevent light from entering the container. The hinge area is a living hinge that is not light tight. A standing wall and a spring plate must be used to prevent light from entering the container through the hinge.

U.S. Pat. No. 4,431,139 discloses a box that is folded together and requires folding many walls over each other to create a light-tight interior. However, this box is light tight only if the exterior walls are bonded, welded, or taped closed; the box is not light tight absent these extraneous materials. Additionally, this box is not reusable.

U.S. Pat. No. 4,313,538 is directed to a film cassette which has a hinged cover which is added to the cassette as a secondary operation. Walls which prevent light from entering the cassette do not have sufficient clearance with the standing walls in the base of the cassette and interfere with the operation of the hinge.

All of the current containers require that the stored sheets be placed in a light-impervious plastic bag to insure that the sheets are not exposed to light. None of the known boxes, cassettes, or other containers provides a reusable container for light-sensitive sheet material which is light tight without using any external sealing devices or interior bags. None of the known containers can be opened and closed many times while the container provides a light-tight closure each time it is closed. There is a need for a resilient reusable container that is resistant to the entrance of light, dust, and moisture, and that stores sheets flat and is inexpensive to produce.

SUMMARY OF THE INVENTION

The present invention is a reusable, reclosable, light-tight container for storing a plurality of sheets of light-sensitive material. The container includes a lower wall having an inner surface, an upper wall having an inner surface, a container hinge connecting the upper wall to the lower wall, and side walls. The hinge permits the container to be opened and closed. A reclosable light-tight closure of the container is formed when the container is closed with the lower and upper walls mating with each other. Any light attempting to enter the container is forced to make at least one direction change.

The light-tight closure includes an unbroken wall formed on the inner surface of the lower wall. This unbroken wall extends completely around and encloses the inner surface of the container to create a cavity in which the sheets can be stored. The unbroken wall includes an inside surface, an outside surface, and a top surface. An upper wall raised platform on the inner surface of the upper wall extends around the inner surface of the upper wall and includes an inside surface, an outside surface, and a top surface. The top surface of the upper wall raised platform abuts the inner surface of the lower wall outside of the unbroken wall when the container is closed. The inside surface of the upper wall raised platform abuts the outside surface of the unbroken wall when the container is closed. The upper wall raised platform blocks light from entering the container by covering the parting line between the unbroken wall on the lower wall and the upper wall.

The width of the top surface of the unbroken wall can be substantially equal to the width of the upper wall raised platform to form a lower wall raised platform on the inner surface of the lower wall. The lower wall raised platform extends completely around the outside of the unbroken wall. The upper wall raised platform abuts the top surface of the lower wall raised platform when the container is closed.

The container can include a door formed in the upper wall. The door is hinged to the upper wall. A reclosable light-tight closure for the door in the area of the door hinge enables the door to be opened and closed many times while permitting the container to provide a light-tight closure each time the door is closed. This forces any light attempting to enter the container to make at least one direction change.

The light-tight door closure includes a tab formed on the unbroken wall and a tab-receiving cutaway portion located on the upper wall surrounding the door hinge ends. The shape of the tab is complementary to the shape of the tab-receiving cutaway portion, and the tab and the tab-receiving cutaway area mate when the container is closed. A door hinge wall formed on the inner surface of the lower wall outside the unbroken wall and adjacent the tab is located to block light from entering the container through the door hinge by covering the parting line between the tab and the tab receiving cutaway portion. A door hinge wall-receiving cutaway portion is located on the upper wall adjacent the tab-receiving cutaway portion. The shape of the door hinge wall is complementary to the shape of the door hinge wall-receiving cutaway portion, and the door hinge wall and the door hinge wall-receiving cutaway portion mate when the container is closed.

DETAILED DESCRIPTION OF PREFERRED EMBODIMENT

Figure 1:
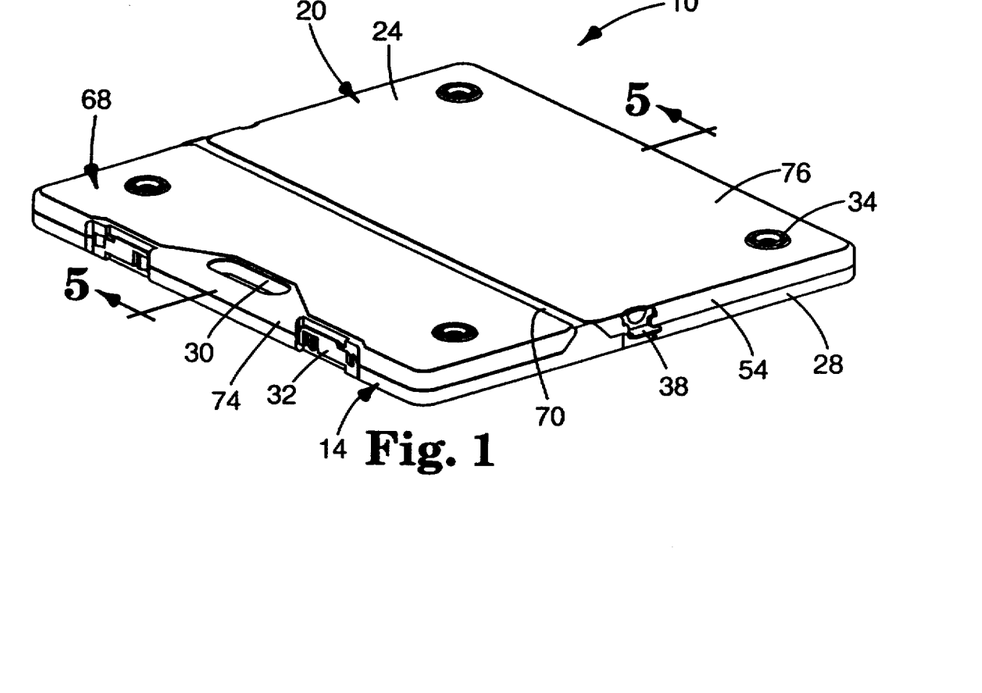
FIG. 1 is a perspective view of a reclosable light-tight container according to the present invention with the container closed.
Figure 2:
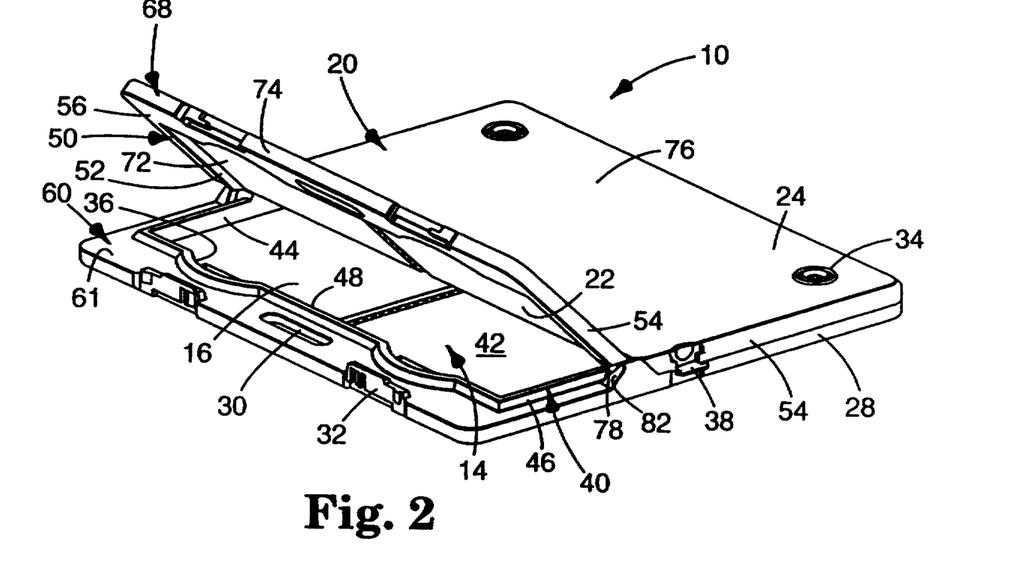
FIG. 2 is a perspective view of the container of FIG. 1 with the container door open.
Figure 3:
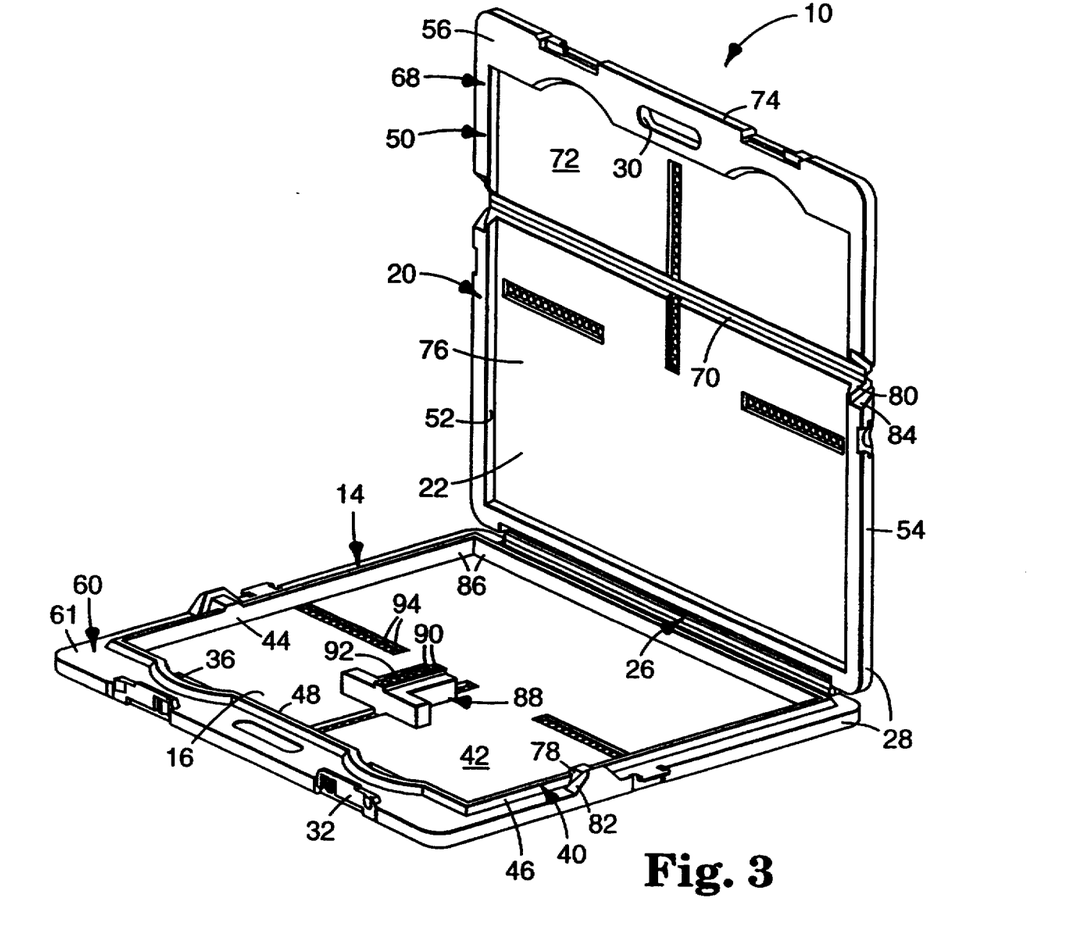
FIG. 3 is a perspective view of the container of FIG. 1 with the container open.
Figure 4:
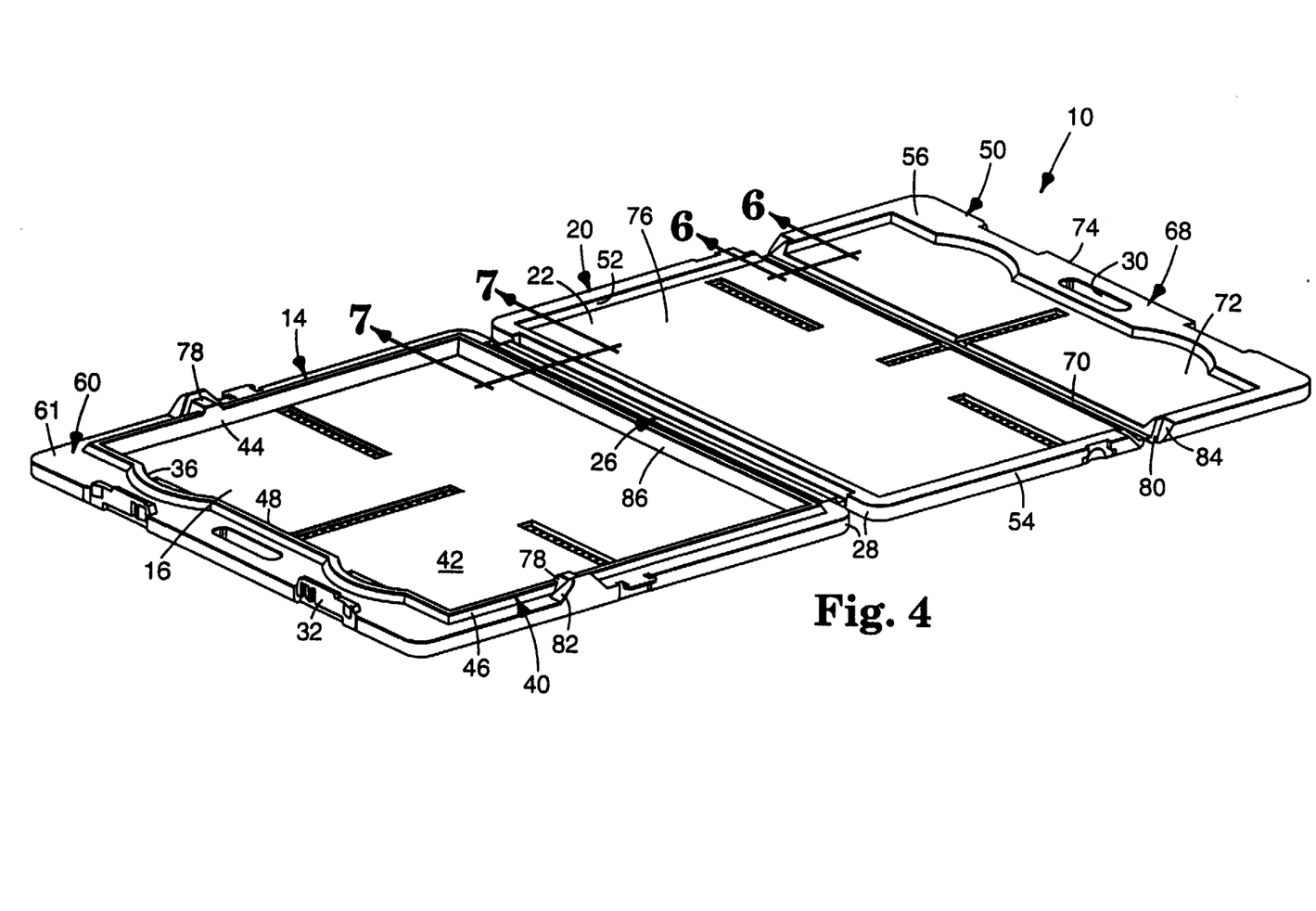
FIG. 4 is a perspective view of the container of FIG. 1 with the container open and the two container halves coplanar.

The Figures show a reclosable light-tight container 10 for storing a plurality of planar objects in a substantially flat position. The planar objects can be any type of sheets (not shown). FIG. 1 shows the container 10 closed, which is suitable for storing and transporting sheets. FIG. 2 shows the container 10 with the door open and FIGS. 3 and 4 show the container 10 open, permitting access to the sheets.

The container 10 includes a lower wall 14 having an inner surface 16 and an outer surface 18, an upper wall 20 connected to the lower wall 14 and having an inner surface 22 and an outer surface 24, and a container hinge 26 connecting the upper wall 20 to the lower wall 14. The hinge 26 permits the container 10 to be opened and closed. Labyrinth type seals can be used to seal around the hinge 26 as well as other hinges and areas of the container 10. A plurality of side walls 28 are formed as one piece with each of the lower and upper walls 14, 20.

The container 10 also includes at least one handle 30 which can be ergonomically shaped for manual gripping of the container. The container 10 is secured closed using a latch 32 which can be any known latch including those described in U.S. Pat. No. 4,974,740 which are triple-acting, requiring pushing, pulling, and sliding to unlock the container 10. Also, the inner surfaces 16, 22 may be configured to include ribs, notches, or valleys which add rigidity and prevent twisting of the container 10.

The container 10 also can include stacking devices, such as buttons 34, which permit two containers to nest and stack on each other while limiting lateral movement. Raised male members can be formed on the outer surface 18 of the lower wall 14 with complementary female recesses are formed on the outer surface 24 of the upper wall 20. Alternatively, the male members can be formed on the upper wall 20 with the female recesses formed on the lower wall 14. Alternatively, both male members and female recesses can be formed on both the lower and upper walls 14, 20.

The container 10 can include curved portions 36 formed in the side walls 28. These curved portions 36 permit a user to insert fingers into the container 10 to grasp the sheets and aid removal of the sheets from the container. The inner walls 28 could be angled to allow manual gripping of the edge of at least one sheet. Also, a recess (not shown) can be located near and extending at least partially under an edge of the sheets, or one or more protrusions (not shown) can be used to allow a person or instrument to reach under the sheets. Other modifications can be used to permit gripping of at least one of the sheets.

Referring also to FIGS. 3–8, the container 10 includes a reclosable light-tight closure system which provides a reclosable light-tight closure of the container 10 when the container is closed with the lower and upper walls 14, 20 mating with each other. This system enables the container 10 to be opened and closed many times while permitting the container to provide a light-tight closure each time the container is closed. This system forces any light attempting to enter the container 10 to make at least one direction change.

The light-tight closure system is essentially a double wall system in which the parting line for the outer walls are offset from the parting line for the inner walls. The inner walls can form the interior cavity while the outer walls provide the light seal. This system includes an unbroken wall 40 formed on the inner surface 16 of the lower wall 14. The unbroken wall 40 extends completely around and encloses at least a part of the inner surface 16 to create a cavity 42 in which the sheets can be stored. The unbroken wall 40 includes an inside surface 44 facing the cavity 42, an outside surface 46 opposite the inside surface, and a top surface 48 substantially parallel to the inner surface 16 of the lower wall 14 which connects the inside and outside surfaces.

An upper wall raised platform 50 is formed on the inner surface 22 of the upper wall 20. The upper wall raised platform 50 extends around the inner surface 22 of the upper wall 20 and includes an inside surface 52, an outside surface 54 opposite the inside surface, and a top surface 56 substantially parallel to the inner surface 22 of the upper wall 20 which connects the inside and outside surfaces. The upper wall raised platform 50 combines with the lower wall unbroken wall 40 to create the cavity 42 in which the sheets can be stored. The upper wall raised platform 50 is shaped to cause its top surface 56 to abut the inner surface 16 of the lower wall 14 outside of the unbroken wall 40 when the container 10 is closed. The upper wall raised platform 50 shape also causes its inside surface 52 to abut the outside surface 46 of the unbroken wall 40 when the container 10 is closed. The upper wall raised platform 50 is located to block light from entering the container 10 by completely covering the parting line 58 between the unbroken wall on the lower wall 14 and the upper wall 20.

In the embodiment shown in the Figures, a lower wall raised platform 60 is formed on the inner surface 16 of the lower wall 14. The lower wall raised platform 60 extends completely around the unbroken wall 40 and has a top surface 61 which is substantially parallel to the inner surface 16 of the lower wall 14. The upper wall raised platform 50 abuts the top surface 61 of the lower wall raised platform 60 when the container 10 is closed. It is preferred that the height of the lower wall raised platform 60 be less than the height of the upper wall raised platform 50.

The combination of the upper wall raised platform 50 and either the unbroken wall 40 or the lower wall raised platform 60 prevents light from entering the cavity 42 of the container 10. These walls totally enclose the cavity and are formed inside of the hinge 26 to prevent light from entering through the hinge area. The parting line 59 between the unbroken wall 40/lower wall raised platform 60 and the upper wall raised platform 50 is offset from the parting line 58 between the unbroken wall on the lower wall 14 and the upper wall 20. This forces any light attempting to enter the container 10 to make at least one direction change and maintains the container light tight.

The container 10 can be substantially flat with the lower and upper walls 14, 20 substantially coplanar when the container is open. To accomplish this, the container hinge 26 which connects the lower and upper walls 14, 20 includes two hinges 62, 64. The two hinges 62, 64 are separated by a wall portion 66. The container lower wall 14 is hinged 62 to one side of the wall portion 66 and the container upper wall 20 is hinged 64 to the other side of the wall portion 66.

In the illustrated embodiments, the container 10 includes a door 68 formed in the upper wall 20. By using the door 68 to provide entrance into the inner cavity 42, the container 10 can be opened and closed without destroying the integrity of the container to permit sheets to be placed inside of and removed from the container. The door 68 is hinged at hinge 70 to the upper wall 20 and divides the upper wall into a door section 72 located between the door hinge 70 and the free end 74 of the upper wall 20 and a wall section 76 located between the container hinge 26 and the door hinge 70. The wall section 76 is latched to the lower wall 14 by two latches 38, one on each side of the wall section 76. The latches 38 are latched closed to keep the wall section 76 in place when the door section 72 is opened to remove sheets. The latches 38 are opened to allow the wall section 76 to pivot open to facilitate filling the container 10 with sheets.

This container 10 also includes a reclosable light-tight closure system for the door 68 in the area of the door hinge 70 which provides a reclosable light-tight closure of the container when the container is closed. This enables the door 68 to be opened and closed many times while permitting the container 10 to provide a light-tight closure each time the door is closed. This forces any light attempting to enter the container 10 to make at least one direction change.

The light-tight door closure system includes a tab 78 formed on the unbroken wall 40. A tab-receiving cutaway portion 80 is located on the upper wall 20 extending completely around the ends of the door hinge 70. The shape of the tab 78 is complementary to the shape of the tab-receiving cutaway portion 80, and the tab 78 and the tab-receiving cutaway portion 80 mate when the container 10 is closed. A door hingewall 82 is formed on the inner surface 16 of the lower wall 14 outside the unbroken wall 40 and adjacent the tab 78. The door hinge wall 82 is located to, block light from entering the container 10 through the door hinge 70 by completely covering the parting line between the tab 78 and the tab receiving cutaway portion 80. A door hinge wall-receiving cutaway portion 84 is located on the upper wall 20 adjacent the tab-receiving cutaway portion 80. The shape of the door hinge wall 82 is complementary to the shape of the door hinge wall-receiving cutaway portion 84, and the door hinge wall 82 and the door hinge wall-receiving cutaway portion 84 mate when the container 10 is closed.

In the preferred embodiment, the container 10 is constructed of impact resistant plastic, such as high density polyethylene. The container 10 may be formed by many different molding processes. Common methods of molding include injection, extrusion, transfer, and blow molding, and twin sheet thermoforming. Each of these processes can be used to produce the container 10 of the present invention. Preferably, a dual wall construction is used to reduce or prevent damage to the contents of the container in the event of impact.

The present invention can be made by blow molding at least one parison into the lower wall 14 and upper wall 20 to form the shell of the container 10. The container 10 can be molded in one piece, including the lower and upper walls 14, 20 connected by an integral living hinge 26. A living hinge is a joint between two adjacent sections of the container formed by compression of the container material along a line during fabrication of the container. The container material along that line is thinner than the surrounding material, and allows the adjacent sections of the container to pivot with respect to each other. Alternatively, a separate hinge could be used.

The cavity mold corresponds to the desired shape of the container 10, including light seals, dust seals, living hinge, and handles. A single piece container is most suitable for smaller applications, because blow molding becomes more difficult as the size of the workpiece is increased. Thus it may be desirable to form the container by blow molding a plurality of pieces and fastening them together to form either or both the upper body or the lower body.

Molding the container 10 in a single piece allows for increased work rates, less expensive processing, and better light and dust sealing characteristics. Containers constructed to store sheets measuring less than approximately 20"×24" are more effectively constructed in a single piece. Containers for storing sheets measuring larger than approximately 20"×24" are more effectively constructed using multiple pieces that are separately molded and later fastened together. Similarly, in containers of other geometries, multiple hinges or reinforcing members may be used, including one or more living hinges. The geometry of the container depends on the size of the sheets to be stored, and another benefit of the container 10 is that it can be made for and used with sheets of virtually any dimension.

The container 10 also includes a system for retaining the sheets within the container so that the sheets do not move laterally within the container. In the illustrated embodiment, this includes inner walls 86 and a positioner 88. A positioner 88 may be located at various predetermined locations within the container 10 corresponding to common sheet sizes. Also, a plurality of positioners 88 could be used in place of inner walls 86.

Figure 5:
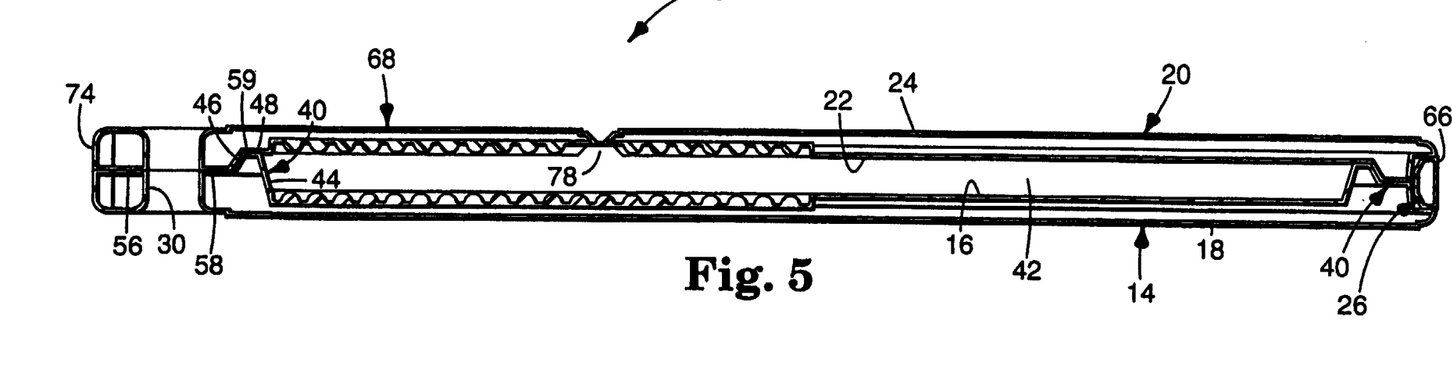
FIG. 5 is a cross-sectional view of the closed container taken along line 5—5 of FIG. 1.
Figure 6:
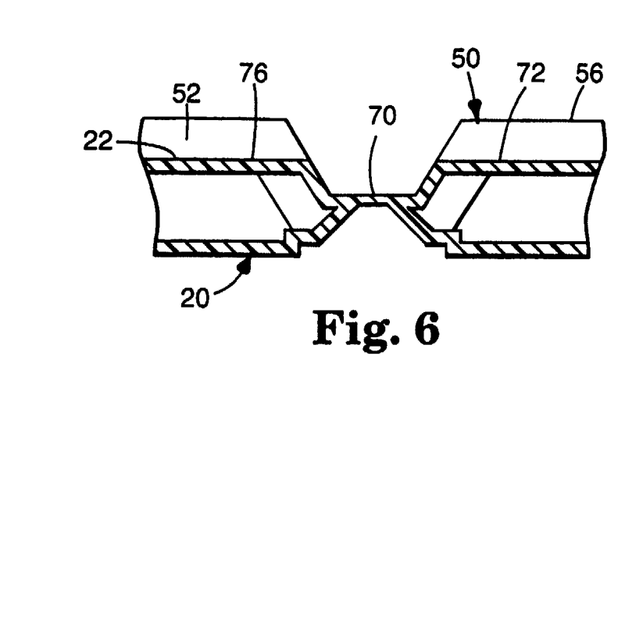
FIG. 6 is a cross-sectional view of the open container taken along line 6—6 of FIG. 4.
Figure 7:
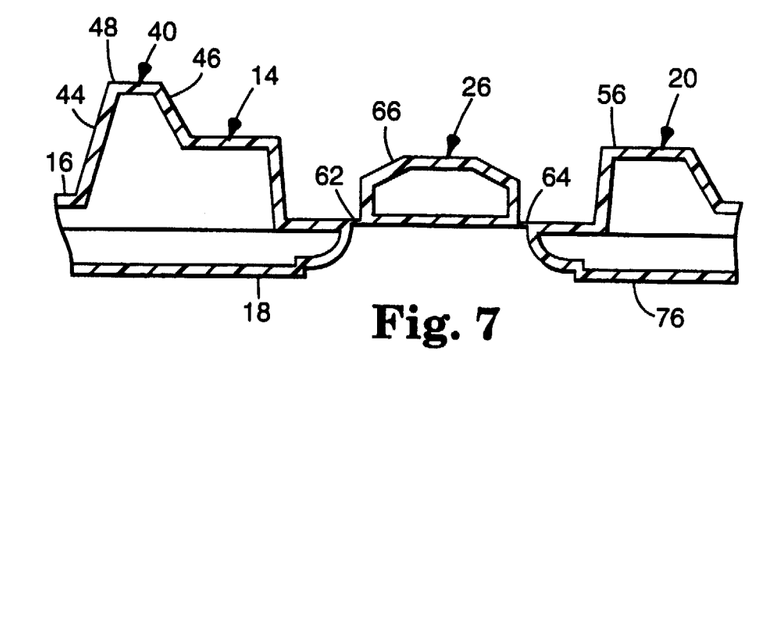
FIG. 7 is a cross-sectional view of the open container taken along line 7—7 of FIG. 4.
Figure 8:
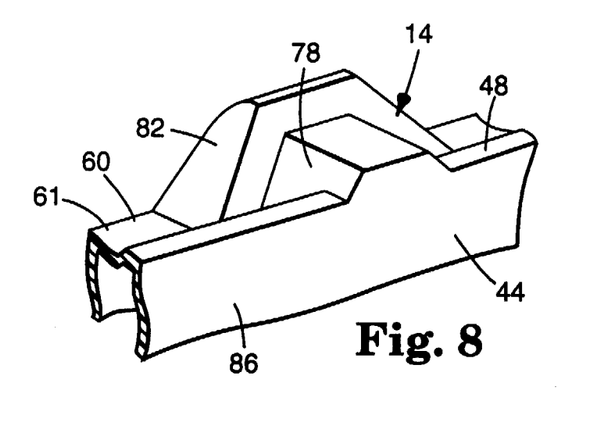
FIG. 8 is an enlarged perspective view of a portion of the container of FIG. 1 showing the light-tight closure.

The positioners 88 can be straight, L-shaped, or T-shaped, depending on where in the container they are to be located and what size sheets are to be stored. The positioners 88 can be placed in the container using a complementary male-female system, such as with a series of openings 90 formed in the inner surface 16 of the lower wall 14 which receive projections 92 formed on the lower surface of the positioners 88. The openings 90 can be formed directly on the inner surface 16 or they can be formed on a raised portion (not shown) formed on the inner surface. Also, the openings can be formed as the spaces between a series of spherical projections 94 as best shown in FIG. 5. A similar set of openings 90 can be formed on the inner surface 22 of the upper wall 20 with a set of projections 92 formed on the upper surface of the positioners to further secure the positioners 88.

Figure 9:
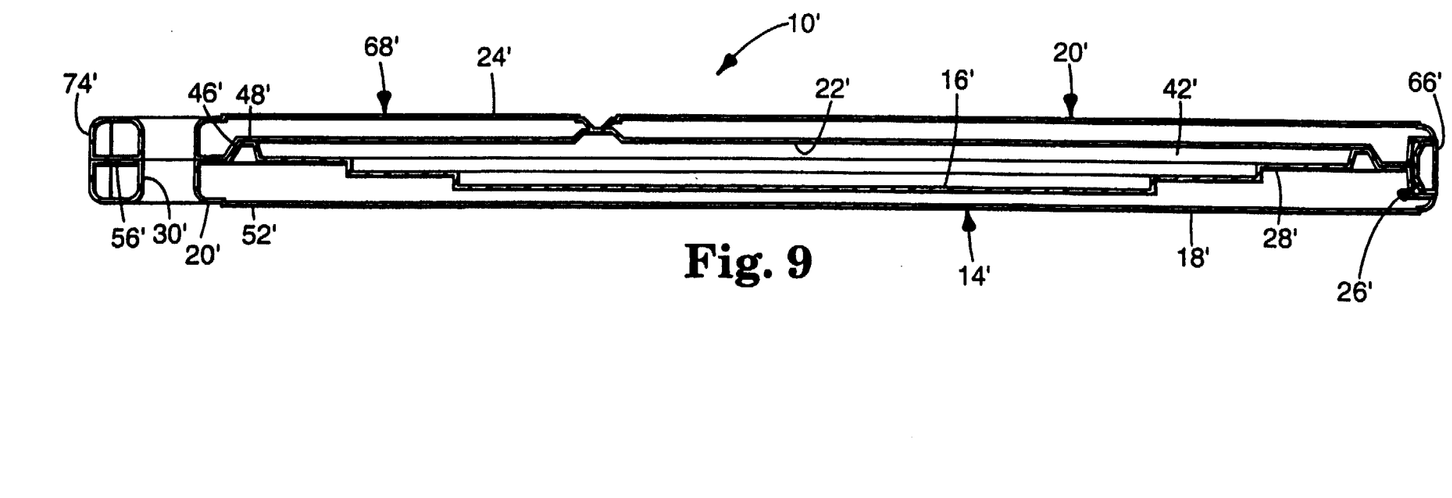
FIG. 9 is a cross-sectional view of the reclosable light-tight container according to another embodiment of the present invention showing another system of facilitating sheet sizing.

Alternatively, the inner surface 16 of the lower wall 14 could retain the sheets within the container 10 without lateral movement of the sheets by forming on the inner surface 16 of the lower wall 14 a series of concentric steps 96 which step away from the inner surface 16 and toward the unbroken wall 40, as shown in FIG. 9. The steps receive sheets of different sizes, such that when differently sized sheets are successively placed in the container 10 with each sheet placed in the container before any larger sized sheets, each sheet is received in the smallest opening that will receive it. The steps 96 need not be concentric as long as they are of increasing, perimeters which may or may not share one or two common sides. Other variations could include any mechanical apparatus or configuration of the container 10 that exerts a force against the sheets to prevent relative motion, such as a spring arrangement or a major inner surface adapted to press the sheet or sheets against an opposed major inner surface. Another possible system for retaining the sheets could include apparatus which engage holes punched in the sheets or walls configured to match the pattern of an edge or edges of the sheets.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be affected therein by one skilled in the art without departing from the scope or spirit of the invention. For example, although the unbroken wall is described as a continuous wall, it need not be continuous in areas which are otherwise light tight.

We claim:

1. A reclosable light-tight container for storing a plurality of sheets of light-sensitive material comprising:
   a lower wall having an inner surface;
   an upper wall connected to the lower wall and having an inner surface;
   a plurality of side walls connecting the lower and upper walls;
   a door formed as part of the upper wall;
   a door hinge formed on the upper wall to permit the container to be opened and closed without destroying the integrity of the container to permit sheets to be placed inside of and removed from the container; and
   means for providing a reclosable light-tight closure of the door by closing the door, wherein the door can be opened and closed many times while permitting the container to provide a light-tight closure each time the door is closed, wherein the door providing means forces any light attempting to enter the container to make at least one direction change and wherein the door providing means comprises:
   an unbroken wall formed on the inner surface of the lower wall and extending completely around and enclosing at least a part of the inner surface of the lower wall corresponding to the location of the door when the door is closed to create a cavity in which the sheets can be stored, wherein the unbroken wall comprises an inside surface facing the cavity, an outside surface opposite the inside surface, and a top surface substantially parallel to the inner surface of the lower wall which connects the inside and outside surfaces and which contacts the inner surface of the upper wall when the container is closed; and
   a door raised platform formed on the inner surface of the upper wall door, wherein the door raised platform extends around the inner surface of the upper wall door and comprises an inside surface, an outside surface opposite the inside surface, and a top surface substantially parallel to the inner surface of the lower wall which connects the inside and outside surfaces, wherein the door raised platform is shaped to cause the top surface of the door raised platform to abut the inner surface of the lower wall outside of the unbroken wall when the door is closed, and wherein a parting line between the inner surface of the lower wall and the door raised platform is offset from a parting line between the unbroken wall and the upper wall to enable the door raised platform to block light from entering the container by covering the parting line between the unbroken wall and the upper wall;
   a cutaway portion located on the upper wall extending completely across the ends of the door hinge;
   a door hinge wall formed on the inner surface of the lower wall outside the unbroken wall, wherein the door hinge wall is located to block light from entering the container through the door hinge; and
   a door hinge wall-receiving cutaway portion located on the upper wall adjacent the tab-receiving cutaway portion, wherein the shape of the door hinge wall is complementary to the shape of the door hinge wall-receiving cutaway portion, and wherein the door hinge wall and the door hinge wall-receiving cutaway portion mate when the container is closed.

2. The container of claim 1 further comprising a tab formed on the unbroken wall, wherein the shape of the tab is complementary to the shape of the tab-receiving cutaway portion, wherein the tab and the tab-receiving cutaway area mate when the container is closed, wherein the door hinge is adjacent the tab, and wherein the door hinge wall completely covers a parting line between the tab and the tab receiving cutaway portion.

3. A reclosable light-tight container for storing a plurality of sheets of light-sensitive material comprising:
   a lower wall having an inner surface;
   an upper wall connected to the lower wall and having an inner surface;
   a container hinge connecting the upper wall to the lower wall and permitting the container to be opened and closed;
   a plurality of side walls formed as one piece with at least one of the lower and upper walls;

means for providing a reclosable light-tight closure of the container by closing the container to mate the lower and upper walls, wherein the container can be opened and closed many times while the container providing means permits the container to provide a light-tight closure each time the container is closed, and wherein the container providing means forces any light attempting to enter the container to make at least one direction change and comprises:

an unbroken wall formed on the inner surface of the lower wall and extending completely around and enclosing at least a part of the inner surface to create a cavity in which the sheets can be stored, wherein the unbroken wall comprises an inside surface facing the cavity, an outside surface opposite the inside surface, and a top surface substantially parallel to the inner surface of the lower wall which connects the inside and outside surfaces and which contacts the inner surface of the upper wall when the container is closed;

an upper wall raised platform formed on the inner surface of the upper wall, wherein the upper wall raised platform extends around the inner surface of the upper wall and comprises an inside surface, an outside surface opposite the inside surface, and a top surface substantially parallel to the inner surface of the upper wall which connects the inside and outside surfaces, wherein the upper wall raised platform is shaped to cause the top surface of the upper wall raised platform to abut the inner surface of the lower wall outside of the unbroken wall when the container is closed, and wherein the parting line between the inner surface of the lower wall and the upper wall raised platform is offset from the parting line between the unbroken wall and the upper wall to enable the upper wall raised platform to block light from entering the container by covering the parting line between the unbroken wall and the upper wall;

a door hinge formed on the upper wall to divide the upper wall into a door section located between the door hinge and the free end of the upper wall and a wall section located between the container hinge and the door hinge, wherein the door hinge permits the container to be opened and closed without destroying the integrity of the container to permit sheets to be placed inside of and removed from the container; and means for providing a reclosable light-tight closure of the door section in the area of the door hinge by closing the door section, wherein the door section can be opened and closed many times while permitting the container to provide a light-tight closure each time the door section is closed, and wherein the door providing means forces any light attempting to enter the container to make at least one direction change and comprises:

a cutaway portion located on the upper wall extending completely across the ends of the door hinge;

a door hinge wall formed on the inner surface of the lower wall outside the unbroken wall, wherein the door hinge wall is located to block light from entering the container through the door hinge; and a door hinge wall-receiving cutaway portion located on the upper wall adjacent the tab-receiving cutaway portion, wherein the shape of the door hinge wall is complementary to the shape of the door hinge wall-receiving cutaway portion, and wherein the door hinge wall and the door hinge wall-receiving cutaway portion mate when the container is closed.

4. The container of claim 3 further comprising a tab formed on the unbroken wall, wherein the shape of the tab is complementary to the shape of the tab-receiving cutaway portion, wherein the tab and the tab-receiving cutaway area mate when the container is closed, wherein the door hinge is adjacent the tab, and wherein the door hinge wall completely covers the parting line between the tab and the tab receiving cutaway portion.

5. A reclosable light-tight container for storing a plurality of sheets of light-sensitive material comprising:

a lower wall having an inner surface;

an upper wall connected to the lower wall and having an inner surface;

a container hinge connecting the upper wall to the lower wall and permitting the container to be opened and closed;

a plurality of side walls formed as one piece with at least one of the lower and upper walls;

means for providing a reclosable light-tight closure of the container by closing the container to mate the lower and upper walls, wherein the container can be opened and closed many times while the container providing means permits the container to provide a light-tight closure each time the container is closed, and wherein the container providing means forces any light attempting to enter the container to make at least one direction change and comprises:

an unbroken wall formed on the inner surface of the lower wall and extending completely around and enclosing at least a part of the inner surface to create a cavity in which the sheets can be stored, wherein the unbroken wall comprises an inside surface facing the cavity, an outside surface opposite the inside surface, and a top surface substantially parallel to the inner surface of the lower wall which connects the inside and outside surfaces and which contacts the inner surface of the upper wall when the container is closed; and an upper wall raised platform formed on the inner surface of the upper wall, wherein the upper wall raised platform extends around the inner surface of the upper wall and comprises an inside surface, an outside surface opposite the inside surface, and a top surface substantially parallel to the inner surface of the upper wall which connects the inside and outside surfaces, wherein the upper wall raised platform is shaped to cause the top surface of the upper wall raised platform to abut the inner surface of the lower wall outside of the unbroken wall when the container is closed, and wherein the parting line between the inner surface of the lower wall and the upper wall raised platform is offset from the parting line between the unbroken wall and the upper wall to enable the upper wall raised platform to block light from entering the container by covering the parting line between the unbroken wall and the upper wall; and a handle mounted on the container.

6. A reclosable light-tight container for storing a plurality of sheets of light-sensitive material comprising:
a lower wall having an inner surface;
an upper wall connected to the lower wall and having an inner surface;
a container hinge connecting the upper wall to the lower wall and permitting the container to be opened and closed;
a plurality of side walls formed as one piece with at least one of the lower and upper walls;
means for providing a reclosable light-tight closure of the container by closing the container to mate the lower and upper walls, wherein the container can be opened and closed many times while the container providing means permits the container to provide a light-tight closure each time the container is closed, and wherein the container providing means forces any light attempting to enter the container to make at least one direction change and comprises:
an unbroken wall formed on the inner surface of the lower wall and extending completely around and enclosing at least a part of the inner surface to create a cavity in which the sheets can be stored, wherein the unbroken wall comprises an inside surface facing the cavity, an outside surface opposite the inside surface, and a top surface substantially parallel to the inner surface of the lower wall which connects the inside and outside surfaces and which contacts the inner surface of the upper wall when the container is closed; and
an upper wall raised platform formed on the inner surface of the upper wall, wherein the upper wall raised platform extends around the inner surface of the upper wall and comprises an inside surface, an outside surface opposite the inside surface, and a top surface substantially parallel to the inner surface of the upper wall which connects the inside and outside surfaces, wherein the upper wall raised platform is shaped to cause the top surface of the upper wall raised platform to abut the inner surface of the lower wall outside of the unbroken wall when the container is closed, and wherein the parting line between the inner surface of the lower wall and the upper wall raised platform is offset from the parting line between the unbroken wall and the upper wall to enable the upper wall raised platform to block light from entering the container by covering the parting line between the unbroken wall and the upper wall; and
means for aiding removal of at least one of the sheets, wherein the removing means comprises cutout portions formed in the side walls.

7. A reclosable light-tight container for storing a plurality of sheets of light-sensitive material comprising:
a lower wall having an inner surface;
an upper wall connected to the lower wall and having an inner surface;
a container hinge connecting the upper wall to the lower wall and permitting the container to be opened and closed;
a plurality of side walls formed as one piece with at least one of the lower and upper walls;
means for providing a reclosable light-tight closure of the container by closing the container to mate the lower and upper walls, wherein the container can be opened and closed many times while the container providing means permits the container to provide a light-tight closure each time the container is closed, and wherein the container providing means forces any light attempting to enter the container to make at least one direction change and comprises:
an unbroken wall formed on the inner surface of the lower wall and extending completely around and enclosing at least a part of the inner surface to create a cavity in which the sheets can be stored, wherein the unbroken wall comprises an inside surface facing the cavity, an outside surface opposite the inside surface, and a top surface substantially parallel to the inner surface of the lower wall which connects the inside and outside surfaces and which contacts the inner surface of the upper wall when the container is closed; and
an upper wall raised platform formed on the inner surface of the upper wall, wherein the upper wall raised platform extends around the inner surface of the upper wall and comprises an inside surface, an outside surface opposite the inside surface, and a top surface substantially parallel to the inner surface of the upper wall which connects the inside and outside surfaces, wherein the upper wall raised platform is shaped to cause the top surface of the upper wall raised platform to abut the inner surface of the lower wall outside of the unbroken wall when the container is closed, and wherein the parting line between the inner surface of the lower wall and the upper wall raised platform is offset from the parting line between the unbroken wall and the upper wall to enable the upper wall raised platform to block light from entering the container by covering the parting line between the unbroken wall and the upper wall; and
means, including a latch, for closing the container.

8. A reclosable light-tight container for storing a plurality of sheets of light-sensitive material comprising:
a lower wall having an inner surface;
an upper wall connected to the lower wall and having an inner surface;
a container hinge connecting the upper wall to the lower wall and permitting the container to be opened and closed;
a plurality of side walls formed as one piece with at least one of the lower and upper walls;
means for providing a reclosable light-tight closure of the container by closing the container to mate the lower and upper walls, wherein the container can be opened and closed many times while the container providing means permits the container to provide a light-tight closure each time the container is closed, and wherein the container providing means forces any light attempting to enter the container to make at least one direction change and comprises:
an unbroken wall formed on the inner surface of the lower wall and extending completely around and enclosing at least a part of the inner surface to create a cavity in which the sheets can be stored, wherein the unbroken wall comprises an inside surface facing the cavity, an outside surface opposite the inside surface, and a top surface substantially parallel to the inner surface of the lower wall which connects the inside and outside surfaces and which contacts the inner surface of the upper wall when the container is closed; and an upper wall raised platform formed on the inner surface of the upper wall, wherein the upper wall raised platform extends around the inner surface of the upper wall and comprises an inside surface, an outside surface opposite the inside surface, and a top surface substantially parallel to the inner surface of the upper wall which connects the inside and outside surfaces, wherein the upper wall raised platform is shaped to cause the top surface of the upper wall raised platform to abut the inner surface of the lower wall outside of the unbroken wall when the container is closed, and wherein the parting line between the inner surface of the lower wall and the upper wall raised platform is offset from the parting line between the unbroken wall and the upper wall to enable the upper wall raised platform to block light from entering the container by covering the parting line between the unbroken wall and the upper wall; and means for retaining the sheets within the container so that the sheets do not move laterally within the container, wherein the retaining means comprises a positioner which is locatable at various predetermined locations within the container such that the positioner combines with the unbroken wall of the container to correspond to common sheet sizes.

9. The container of claim 8 wherein the retaining means comprises a plurality of positioners.

10. The container of claims 8 further comprising means for securing the positioner in the container, wherein the securing means comprises a series of openings formed in the inner surface of the lower wall and at least one post formed on a lower surface of the positioner, wherein the post is receivable in one of the openings.

11. The container of claim 10 wherein the securing means further comprises a raised portion formed on the lower surface, wherein the openings are formed on the raised portion.

12. A reclosable light-tight container for storing light-sensitive material comprising:

a lower wall having an inner surface and an unbroken wall formed on the inner surface and extending around and enclosing at least a part of the inner surface to create a cavity in which the sheets can be stored;

an upper wall having an inner surface and a free end;

a container hinge connecting the upper wall to the lower wall and permitting the container to be opened and closed;

means for providing a reclosable light-tight closure of the container by closing the container to mate the lower and upper walls;

a door hinge formed on the upper wall to divide the upper wall into a door section located between the door hinge and the free end of the upper wall and a wall section located between the container hinge and the door hinge; and means for providing a reclosable light-tight closure of the door section in the are of the door hinge by closing the door section, wherein the door section can be opened and closed a plurality of times while permitting the container to provide a light-tight closure each time the door section is closed, wherein the door providing means forces any light attempting to enter the container to make at least one direction change, and wherein the door providing means comprises:

a tab-receiving cutaway portion located on the upper wall extending completely around the ends of the door hinge;

a door hinge wall formed on the inner surface of the lower wall, wherein the door hinge wall is located to block light from entering the container through the door hinge; and a door hinge wall-receiving cutaway portion located on the upper wall adjacent the tab-receiving cutaway portion, wherein the shape of the door hinge wall is complementary to the shape of the door hinge wall-receiving cutaway portion, and wherein the door hinge wall and the door hinge wall-receiving cutaway portion mate when the container is closed.

13. The container of claim 12, further comprising a tab formed on the unbroken wall, wherein the shape of the tab is complementary to the shape of the tab-receiving cutaway portion, wherein the tab and the tab-receiving cutaway portion mate when the container is closed, wherein the door hinge is adjacent the tab, and wherein the door hinge wall completely covers a parting line between the tab and the tab receiving cutaway portion.

14. A reclosable light-tight container for storing light-sensitive material comprising:

a lower wall having an inner surface;

an upper wall having an inner surface and a free end;

a container hinge connecting the upper wall to the lower wall and permitting the container to be opened and closed;

means for providing a reclosable light-tight closure of the container by closing the container to mate the lower and upper walls;

a door hinge formed on the upper wall to divide the upper wall into a door section located between the door hinge and the free end of the upper wall and a wall section located between the container hinge and the door hinge; and at least one positioner locatable at various locations within the container which correspond to sizes of light-sensitive materials.

15. The container of claim 14, further comprising means for securing the positioner in the container, wherein the securing means comprises a series of openings formed in the inner surface of the lower wall and at least one post formed on a lower surface of the positioner, wherein the post is receivable in one of the openings.

16. The container of claim 15, wherein the securing means further comprises a raised portion formed on the lower surface, wherein the openings are formed on the raised portion.

17. The container of claim 16, wherein the closure providing means comprises an unbroken wall formed on the inner surface of the lower wall and extending around and enclosing at least a part of the inner surface to create a cavity in which the sheets can be stored.

18. The container of claim 17, wherein the unbroken wall combines with the positioner to correspond to sizes of light-sensitive materials.

19. The container of claim 14, wherein the container hinge connecting the upper and lower walls comprises means for permitting the container to be substantially flat with the upper and lower walls being substantially coplanar when the container is completely open.

20. The container of claim 14, wherein the container hinge comprises two hinges and a wall portion, wherein the container lower wall is hinged to one side of the wall portion and the container upper wall is hinged to the other side of the wall portion.

* * * * *